US 9,681,606 B2

(12) United States Patent
Mastalir

(10) Patent No.: US 9,681,606 B2
(45) Date of Patent: Jun. 20, 2017

(54) BEET CROP HEAP DIVIDER APPARATUS

(71) Applicant: EXEL INDUSTRIES, Epernay (FR)

(72) Inventor: Leo Mastalir, Hagendorf (AT)

(73) Assignee: Exel Industries, Epernay (FR)

( * ) Notice: Subject to any disclaimer, the term of this patent is extended or adjusted under 35 U.S.C. 154(b) by 0 days.

(21) Appl. No.: 15/049,993

(22) Filed: Feb. 22, 2016

(65) Prior Publication Data
US 2016/0242357 A1 Aug. 25, 2016

(30) Foreign Application Priority Data

Feb. 23, 2015 (EP) .................................... 15305273

(51) Int. Cl.
*B65G 65/22* (2006.01)
*A01D 33/10* (2006.01)
*A01D 51/00* (2006.01)

(52) U.S. Cl.
CPC ........... *A01D 51/005* (2013.01); *A01D 33/10* (2013.01); *B65G 65/22* (2013.01)

(58) Field of Classification Search
CPC .... A01D 25/044; A01D 33/10; A01D 51/005; B65G 65/22
See application file for complete search history.

(56) References Cited

U.S. PATENT DOCUMENTS

| 2,325,704 | A |   | 8/1943  | Passa   |            |
|-----------|---|---|---------|---------|------------|
| 2,608,815 | A | * | 9/1952  | Graaff  | A01D 25/044 |
|           |   |   |         |         | 171/103    |
| 3,140,768 | A | * | 7/1964  | Marr    | A01C 3/04  |
|           |   |   |         |         | 198/308.1  |
| 3,251,456 | A | * | 5/1966  | Branine | B65G 65/22 |
|           |   |   |         |         | 198/657    |
| 3,629,890 | A | * | 12/1971 | Harris  | B60P 1/40  |
|           |   |   |         |         | 15/3.11    |

(Continued)

FOREIGN PATENT DOCUMENTS

| DE | 102006056436 A1 | 5/2008 |            |
|----|-----------------|--------|------------|
| DE | EP 2172093 A1 * | 4/2010 | A01D 33/10 |

(Continued)

OTHER PUBLICATIONS

Extended European Search Report for Application 15305273.3 dated Sep. 15, 2015.

*Primary Examiner* — Mark A Deuble
(74) *Attorney, Agent, or Firm* — Thompson Coburn LLP; Steven M. Ritchey

(57) ABSTRACT

The pick-up apparatus (2) for picking up harvested root crop, in particular sugar beets, from a root crop heap, comprises a pick-up section (8) which defines a pick-up direction PD a pick-up plane PL and a first lateral outward direction LOD1, comprises a pick-up member (24), and a pick-up frame (20), the pick-up frame (20) having a first lateral side (36), a second lateral side (38) and forming a pick-up opening (42), the pick-up opening (42) and the pick-up direction PD defining a pick-up area PA on the pick-up plane PL. The pick-up apparatus (2) comprises a heap divider (10) adapted for dividing the root crop heap and comprising a mobile heap dividing member (100), the mobile heap dividing member is adapted to convey root crop which is situated outside the pick-up area PA into the pick-up area PA.

20 Claims, 5 Drawing Sheets

(56) References Cited

U.S. PATENT DOCUMENTS

| | | | | |
|---|---|---|---|---|
| 4,798,248 A * | 1/1989 | Schwitters | ............. | A01D 33/10 171/1 |
| 5,033,932 A * | 7/1991 | Compton | ............... | A01D 33/10 171/14 |
| 2011/0073440 A1 * | 3/2011 | Dekoning | ............. | B65G 33/32 198/518 |

FOREIGN PATENT DOCUMENTS

| | | |
|---|---|---|
| DE | 202014105122 U1 | 11/2014 |
| EP | 0297622 A1 | 1/1989 |

\* cited by examiner

BEET CROP HEAP DIVIDER APPARATUS

CROSS-REFERENCE TO RELATED APPLICATIONS

The present application is a non-provisional application claiming the benefit of EP 15305273.3, filed Feb. 23, 2015, which is incorporated herein by reference in its entirety.

FIELD OF THE INVENTION

The present invention concerns a pick-up apparatus for picking up harvested root crop from a root crop heap.

BACKGROUND OF INVENTION

In the prior art, pick-up apparatuses of this kind, which are used for picking up sugar beets, are known from EP 2 172 093. These pick-up apparatuses are mounted on transfer loaders such as the "Terra Felis 2" manufactured by HOLMER.

The pick-up apparatuses known in the prior art have a maximum pick-up width, which is around 10 m. This means that the maximum width of the crop heap should not exceed this width. Crop heaps having a larger width are loaded using wheel loaders.

SUMMARY OF INVENTION

The invention seeks to overcome the drawbacks of the prior art and to create a pick-up apparatus that allows picking-up harvested crop arranged in a crop heap having a width larger than the maximum pick-up width. Other objectives of the invention are picking-up the crop while causing little damage to the crop and in an efficient manner.

One embodiment of the present invention is directed to a pick-up apparatus for picking up harvested root crop from a root crop heap, the pick-up apparatus comprising:
  a pick-up section which
    defines a pick-up direction a pick-up plane and a first lateral outward direction,
    comprises a pick-up member,
    and a pick-up frame,
  the pick-up frame having a first lateral side, a second lateral side and forming a pick-up opening,
  the pick-up opening and the pick-up direction defining a pick-up area on the pick-up plane,
  wherein
    the pick-up apparatus comprises a heap divider adapted for dividing the root crop heap and comprising a mobile heap dividing member, in that
    the mobile heap dividing member has an outer end, an inner end and a longitudinal axis, in that
    the mobile heap dividing member has a heap dividing position, in that
    when the mobile heap dividing member is in the heap dividing position, the mobile heap dividing member is adapted to convey root crop which is part of the root crop heap and which is situated outside the pick-up area into the pick-up area to be picked up by the pick-up member,
      the outer end is located laterally outwards of the first lateral side taken in the first lateral outward direction,
    and the longitudinal axis is inclined about an elevation angle $\alpha$ between $\alpha=0°$ and $20°$, with respect to the pick-up plane.

The pick-up apparatus can have one or more of the following features:
  In the heap dividing position, the longitudinal axis is inclined between $\beta=0°$ and $20°$, preferably between $0°$ and $10°$, with respect to the first lateral outward direction.
  In the heap dividing position, the outer end is located with respect to the inner end forward taken in the pick-up direction, and/or, in the heap dividing position, the outer end is located upward of the inner end with respect to the pick-up plane.
  The mobile heap dividing member is a rotatable member, the longitudinal axis being an axis of rotation of the rotatable member.
  The rotatable member is a transport screw, in particular having a lead comprised between 250 mm and 700 mm, preferably between 350 mm and 550 mm, and/or an external diameter comprised between 300 mm and 700 mm and/or a difference between a core diameter and an external screw diameter between 200 mm and 600 mm.
  The mobile heap dividing member has a transport position in which the outer end and the inner end are located between the first and second lateral sides, in particular wherein the mobile heap dividing member is held by an adjustable mounting device mounted on the pick-up frame and the mobile heap dividing member is displaceable between the transport position and the heap dividing position by means of the adjustable mounting device.
  The pick-up apparatus comprises a drive device, in particular a motor, adapted to drive the mobile heap dividing member, in particular in rotation, and in that the drive device is arranged at the inner end of the mobile heap dividing member.
  The pick-up section has a loading member located along the first lateral side.
  The loading member is a loading screw, in particular having a lead comprised between 250 mm and 700 mm, and preferably between 350 mm and 550 mm and/or an external diameter comprised between 300 and 700 mm and/or a difference between a core diameter and an external screw diameter between 200 mm and 600 mm.
  An axis of the loading member defines an angle $\gamma$ between $10°$ and $60°$, with respect to the pick-up plane.
  The loading member has a front end and a rear end defining a loading height, and wherein the inner end of the mobile heap dividing member is arranged, in the dividing position, at a height, measured perpendicular with respect to the pick-up plane, which is located at least at 50% of the loading height.

BRIEF DESCRIPTION OF THE DRAWINGS

The invention will be explained in the following description referring to the annexed figures. All of the disclosed features alone or in any possible combination are part of the invention.

DETAILED DESCRIPTION OF INVENTION

Figure 1:
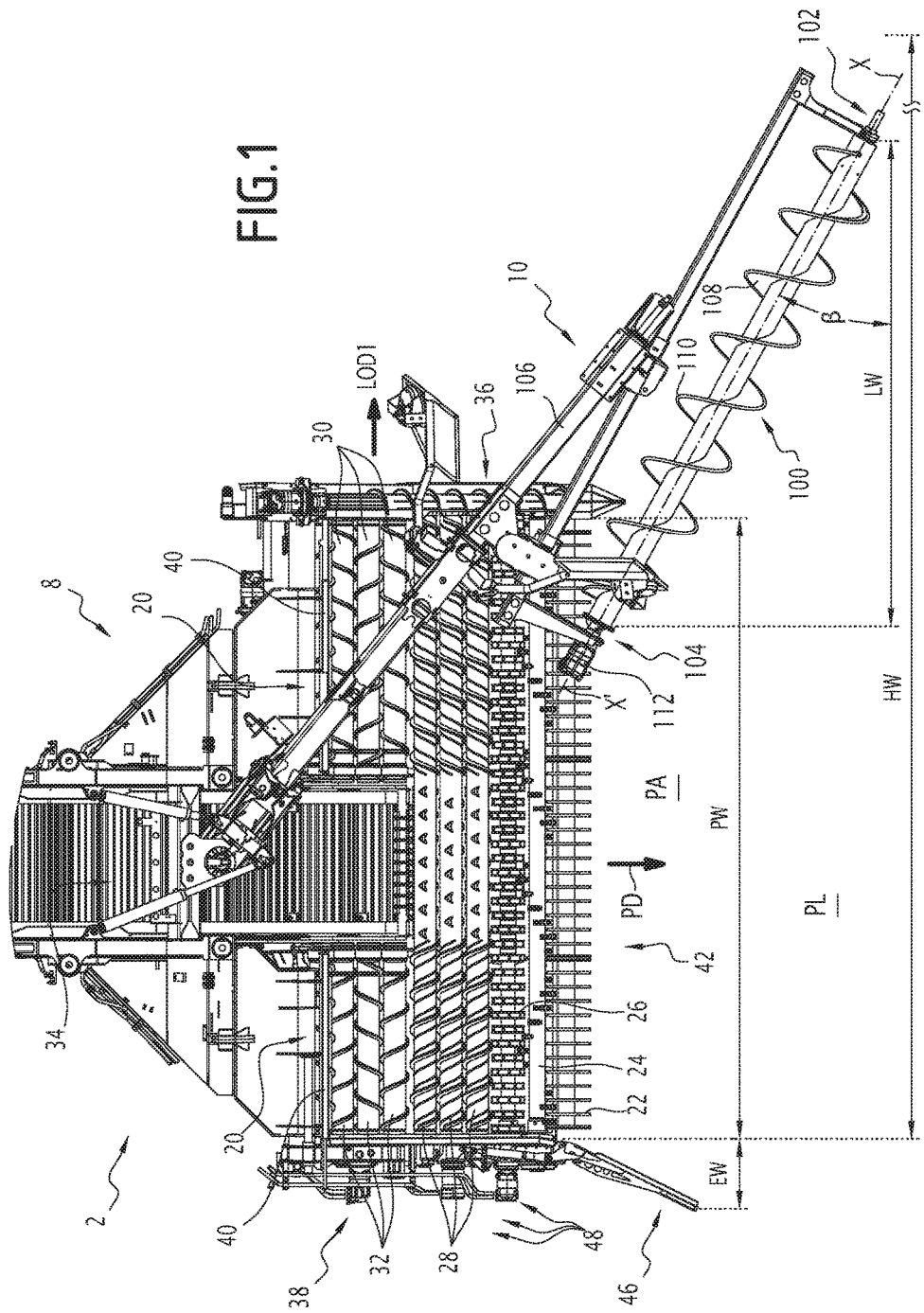
FIG. 1 is a top plan view of the pick-up apparatus according to the invention.

FIGS. 1 to 5 show a pick-up apparatus which is for example part of a not represented pick-up, cleaning and transfer machine for harvested crops, in particular root crops and preferably sugar beets.

The pick-up apparatus is designated 2. The pick-up apparatus 2 is adapted to pick up harvested crops which are arranged in a crop heap 4 (see FIG. 3). The crop heap 4 has a crop heap width HW. The crop heap 4 is made from root crop, for example from sugar beets 6. The crop heap 4 has an angle of repose δ. The angle of repose δ is generally comprised between 35° and 55° with respect to the pick-up plane PL (see below).

The crop heap 4 has in the unprocessed condition two first side slopes S1 extending from a lower end LE of the crop heap 4 to a top end T of the crop heap 4. The first side slope S1 is inclined in relation to the pick-up plane PL by the angle of repose δ. Only one of the first side slopes S1 is visible in FIG. 3.

The pick-up apparatus 2 comprises a pick-up section 8 and a heap divider 10 adapted for dividing the crop heap 4. The pick-up section 8 defines a pick-up direction PD which is generally the direction of displacement of the pick-up apparatus during picking-up. The pick-up section 8 defines also a pick-up plane PL which is, during picking-up, a plane parallel to the ground on which the crop heap is placed.

In the present description, the terms forward/front and backward/back are defined in relation to the pick-up direction PD of the pick-up apparatus 2. The terms upwards/up and downwards/down are defined in relation to the ground on which the crop heap 4 is placed. Upwards/up describes a direction away from this ground, and downwards/down describes a direction towards this ground. The term sideward/lateral describe a direction perpendicular to the pick-up direction PD. When these direction describing terms are used in the present description, they designate a direction in reference to the pick-up apparatus 2, in which the pick-up apparatus 2 is orientated in a normal use orientation.

The pick-up section 8 has a pick-up frame 20. The pick-up section 8 comprises a rake 22, a pick-up roller 24, a cleaning roller 26, distribution rollers 28, first transfer rollers 30 and second transfer rollers 32. The pick-up roller 24 could also be another pick-up member adapted for picking up crops 6. The pick-up roller 24 defines a pick-up width PW for the harvested crop which is generally the axial length of the pick-up roller 24.

The pick-up section 8 comprises also a transfer conveyor 34 adapted to receive the crop 6 from the first and second transfer rollers 30, 32 and to transfer the crop, for example to a truck.

The pick-up frame 20 has a first lateral side 36, a second lateral side 38 and a central portion 40. The pick-up frame 20 forms a pick-up opening 42 which enters into contact with the crop 6 on the crop heap 4 during picking up. The pick-up opening 42 extends between the first and second lateral sides 36, 38. The first and second lateral sides 36, 38 extend parallel one to another.

The pick-up opening 42 and the pick-up direction PD define a pick-up area PA. All harvested root crop 6 on this area are picked up by the pick-up apparatus 2 when the transfer loader moves forward.

In the described embodiment, represented on FIGS. 1 to 4, the second lateral side 38 comprises an enlarging member 46 for enlarging laterally the pick-up width PW of the pick-up roller 24 about an enlarging width EW. The enlarging member 46 comprises panels for guiding root crop 6 toward the pick-up roller 24 when the transfer loader moves forward in the pick-up direction PD.

The pick-up section 8 defines a first lateral outward direction LOD1, which is directed perpendicular to the pick-up direction PD, parallel to the pick-up plane PL and extending from the first lateral side 36 away from the second lateral side 38.

Figure 2:
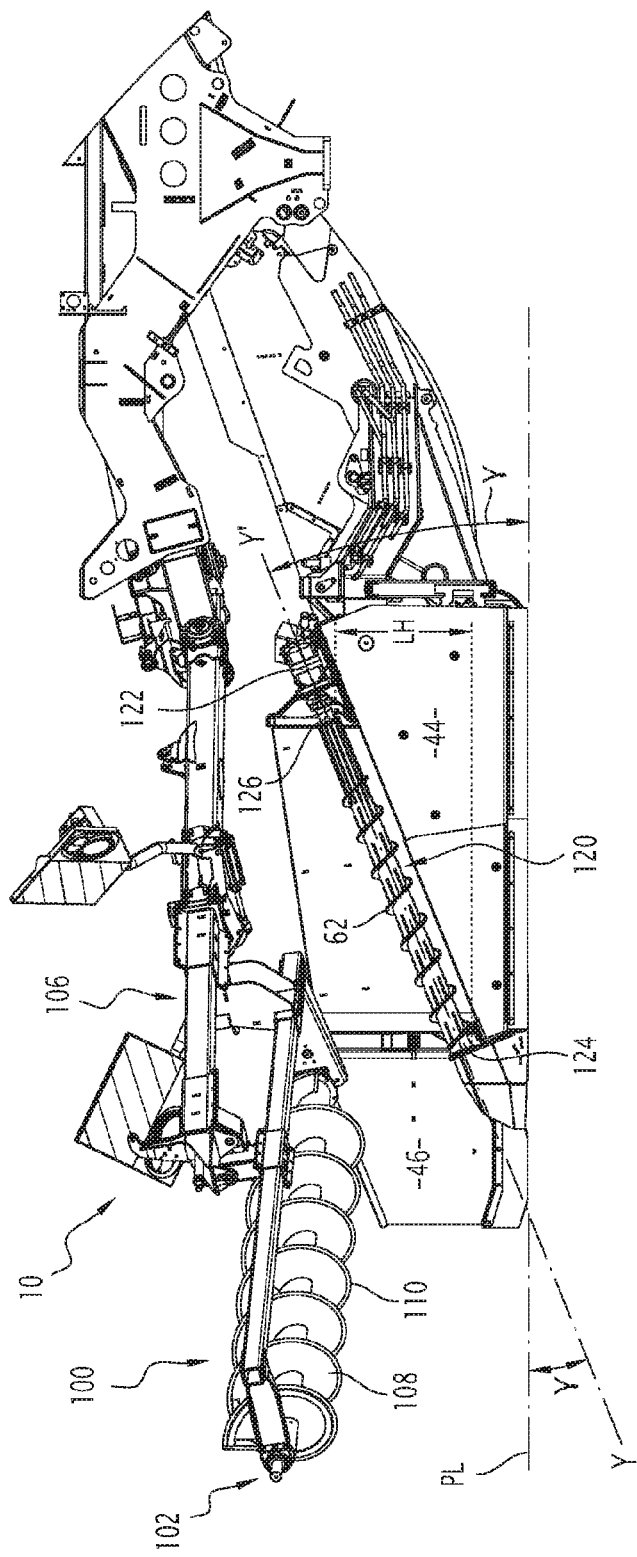
FIG. 2 is a side view of the pick-up apparatus of FIG. 1.
Figure 3:
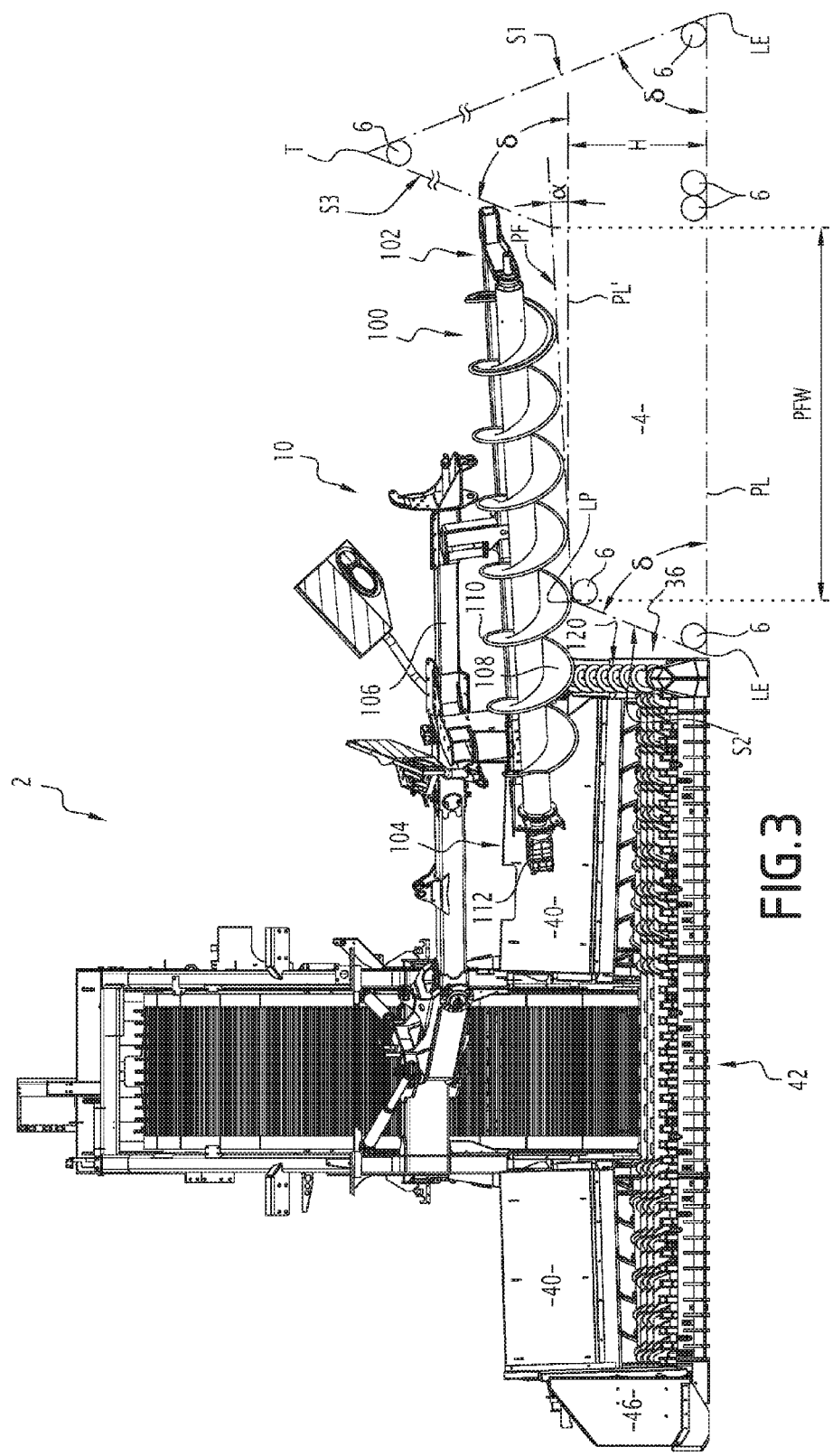
FIG. 3 is a front view of the pick-up apparatus of FIG. 1.
Figure 4:
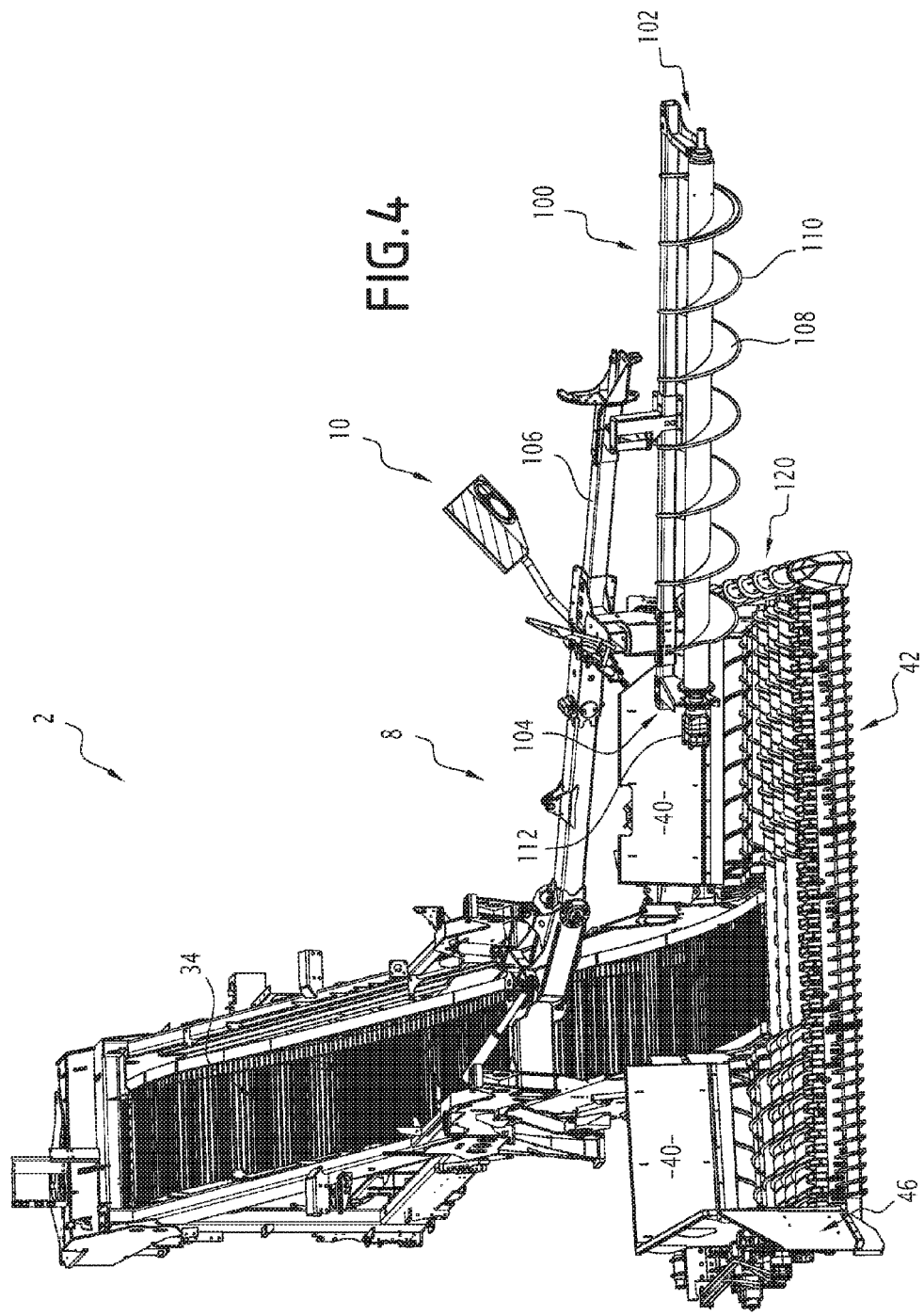
FIG. 4 is a perspective view of the pick-up apparatus of FIG. 1.
Figure 5:
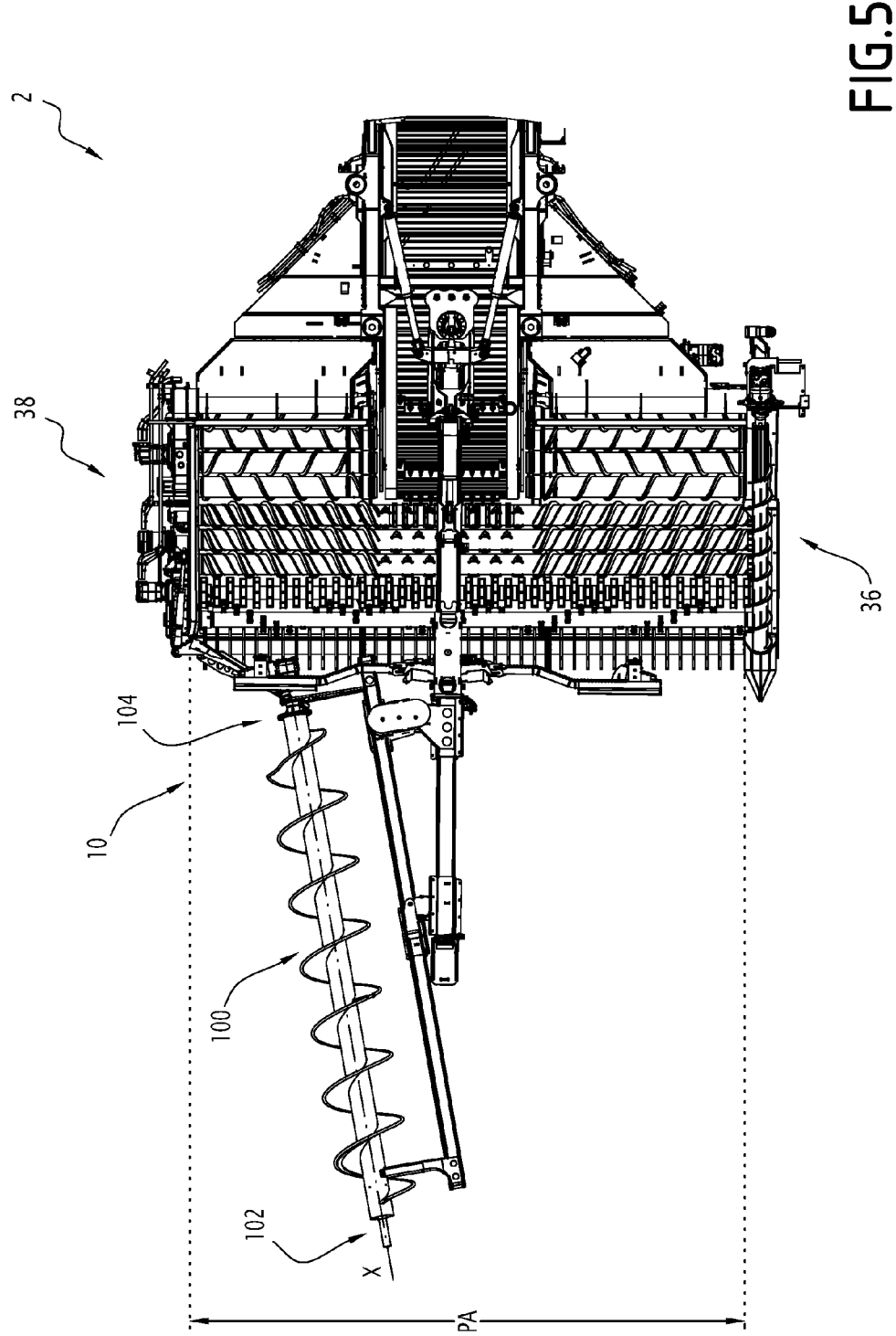
FIG. 5 is a perspective view of the pick-up apparatus of FIG. 1.

The first lateral side 36 has a first lateral external face 44 (see FIG. 2). The first lateral external face 44 is the most outward face of the lateral side 36 taken in the first lateral outward direction LOD1. The external face 44 limits the pick-up section 8 and comprises panels.

The pick-up section 8 comprises transfer roller driving means 48 adapted for driving the first and second transfer rollers 30, 32. The transfer roller driving means 48 can also be adapted for driving each of the cleaning rollers 26 and each of the distribution rollers 28 and the pick-up roller 24. The transfer roller driving means 48 are arranged on the second lateral side 38 of the frame 20. The transfer roller driving means 48 are arranged on the second lateral side 38 opposite the transfer rollers 32. No driving means for driving the pick-up roller 24, the cleaning roller 26, the distribution rollers 28, and/or the transfer rollers 30, 32 are arranged on the first lateral side 36.

The rollers 24, 26, 28, 30 and 32 are each rotatably mounted to the frame 20 around respective rotation axis (not represented).

The heap divider 10 is adapted for dividing the crop heap 4 during picking-up of the crop 6 by the pick-up section 8.

The heap divider 10 comprises a mobile heap dividing member 100.

The mobile heap dividing member 100 is extending along a longitudinal axis X-X' from an outer end 102 located outside the pick-up area PA to an inner end 104 located inside the pick-up area PA.

The mobile heap dividing member 100 is held by an adjustable mounting device 106 mounted on the pick-up section 8 and the dividing member 100 is displaceable between a transport position and a heap dividing position by means of the mounting device 106. The mobile heap dividing member 100 is mobile with respect to the mounting device 106.

In the heap dividing position, the mobile heap dividing member 100 is adapted for conveying harvested crop 6 which is part of the crop heap 4 and which is situated outside the pick-up area PA into the pick-up area PA to be picked up by the pick-up member 24.

The mobile heap dividing member 100 has also a transport position in which the outer end 102 and the inner end 104 are located between the first and second lateral sides 36, 38, and therefore inside the pick-up area PA. In other words, in the transport position, the outer end 102 and the inner end 104 are located inside a volume delimited by the first and second lateral sides 36, 38.

In the heap dividing position, the outer end 102 is located laterally outwards the first lateral side 36 taken in the first lateral outward direction LOD1. In the heap dividing position, the inner end 104 is located laterally between the first and second lateral sides 36, 38.

In the heap dividing position, the inner end 104 is located in front of the first transfer rollers 30 and second transfer rollers 32. In other words, if the position of the inner end 104 is projected on the pick-up plane PL, and if the position of the first transfer rollers 30 and second transfer rollers 32 is projected on the pick-up plane PL, the inner end 104 is located forward of the first rollers 30 and second rollers 32 taken in the pick-up direction PD.

The inner end 104 of the mobile heap dividing member 100 is arranged, in the heap dividing position, at a height, measured perpendicular with respect to the pick-up plane PL, which is located at least at 100 mm, and preferably at least 200 mm, from the pick-up plane PL.

In this heap dividing position, the longitudinal axis X-X' of the heap dividing member 100 is inclined between an elevation angle $\alpha=-10°$ and $40°$, preferably between $\alpha=0°$ and $20°$, with respect to the pick-up plane PL. This inclination describes the elevation angle between the pick-up plane PL and the axis X-X'. In consequence, the outer end 102 is situated upward at a height over the pick-up plane PL which is superior to a height over the pick-up plane PL of the inner end 104.

This positive elevation angle allows the heap dividing member 100 to convey easily the root crop 6 from the outer end 102 to the inner end 104. The principal force exercised by the heap dividing member 100 on the root crop is therefore a force parallel to the pick-up plane PL moving the sugar beets 6 towards the pick-up section 8. Force of gravity on the root crop 6 help to convey the root crop, especially if a sugar beet 6 gets transported by the heap dividing member 100 at a position where an angle between the pick-up plane PL and the sugar beet 6 is greater than the angle of repose 6.

In the heap dividing position, the longitudinal axis X-X' of the heap dividing member 100 is inclined between an azimuthal angle $\beta=10°$ and $50°$, preferably between $\beta=20°$ and $40°$ with respect to the first lateral outward direction LOD1. This corresponds to an azimuthal angle measured from the lateral outward direction LOD1 to the front. In consequence, the outer end 102 of the heap dividing member 100 is located forward of the inner end 104 taken in the pick-up direction PD.

The heap dividing member 100 defines a lateral width LW taken perpendicular to the pick-up direction PD and parallel to the pick-up plane PL or taken along the first lateral direction LOD1, which is spanned by a projection of the inner end 104 and a projection of the outer end 102 on the pick-up plane PL. This lateral width LW is related to the elevation angle and the azimuthal angle of the longitudinal axis X-X' of the heap dividing member 100. For an elevation angle and azimuthal angle of $\alpha=\beta=0°$, the lateral width LW gets maximum. The lateral width LW is preferably between 2500 mm and 4500 mm.

Sugar beets 6 may roll off the top end T of the crop heap 4 and/or may roll off the first side slope S1 of the crop heap 4 when the pick-up apparatus 2 is in contact with the crop heap 4. In this case in the absence of the heap dividing member 100, the sugar beets 6 could roll behind or back of the pick-up section 8 and could not be picked up immediately by the pick-up apparatus 2 during displacement of the pick-up apparatus in the pick-up direction PD.

When the mobile heap dividing member 100 is in the heap dividing position, the inner end 104 is located in front of the first rollers 30 and second rollers 32. In this case, sugar beets 6 which are contacted by the mobile heap dividing member 100 roll down the crop heap 4 in front of the rake 22 and can be picked-up immediately by the pick-up apparatus 2.

The heap dividing member 100 allows creating a divided crop heap in order to render the crop heap more stable and to avoid sugar beets 6 rolling off the crop heap 4 behind or back of the pick-up section 8. Indeed, the heap dividing member 100 allows by the elevation angle $\alpha$ forming of an inclined platform PF (showed in FIG. 3) on the divided crop heap 4. The inclination of the platform PF is inclined in relation to the pick-up plane PL or a plane PL' parallel to the pick-up plane PL. Alternatively, the inclination of the inclined platform PF is $0°$, the platform PF being therefore a platform PF extending parallel to the pick-up plane PL.

The heap dividing member 100 is configured to form, simultaneously to forming the platform PF, a second side slope S2 extending from a lower end LE of the crop heap 4 to the platform PF, and a third side slope S3 extending from the platform PF to the top end T of the crop heap 4.

The platform PF has a platform width PFW taken perpendicular to the pick-up direction PD and parallel to the pick-up plane PL or taken along the first lateral direction LOD1, comprised between 100 mm and 4500 mm.

The platform PF allows for example to receive sugar beets 6 rolling off the top end T of the crop heap 4 or rolling off the third side slope S3 downward to the pick-up plane PL. The sugar beets 6 received by the platform are slowed down and possibly stopped on the platform by contact with the sugar beet already on the platform.

The lowest point LP of the platform PF is located at a height H of at least 100 mm and preferably of at least 200 mm measured from the pick-up plane PL. The lowest point LP of the platform PF can be located at a height comprised between 100 mm and 2500 mm, measured from the pick-up plane PL. The lowest point LP of the platform PF, in case the platform is inclined is located at the edge of the platform PF adjacent the second side slope 2.

The height H of the platform PF is preferably comprised between 500 mm and 1730 mm, measured from the pick-up plane PL. These values provide a good balance between the amount of sugar beets 6 to be conveyed by the mobile heap dividing member 100 and the amount of sugar beets that may roll down the second side slope S2 after the platform PF has been formed.

The mobile heap dividing member 100 is a rotatable member with its longitudinal axis X-X' as rotation axis. In this case, the rotatable member is a transport screw having a lead comprised between 250 mm and 700 mm, preferably between 350 mm and 550 mm. An external diameter of the transport screw is comprised between 300 mm and 700 mm and/or a difference between a core diameter and an external screw diameter between 200 mm and 600 mm.

The transport screw comprises a right-handed thread 108 extending helically clockwise from the outer end 102 to the inner end 104 (FIG. 2). The thread 108 has an inner border directed towards the core of the transport screw, which is fixed with the transport screw. The thread 108 has an outer border directed away from the core of the transport screw, which carries a lip 110. The thread 108 has also an outer portion and an inner portion extending perpendicular to the longitudinal axis X-X' from the core to the lip 110. The outer portion is forming a beginning of the thread, which is adjacent to the outer end 102 of the transport screw, and the inner portion forming an end of the thread, which is adjacent to the inner end 104 of the transport screw.

The pick-up apparatus 2 comprises a drive device 112, in particular a motor, adapted to drive the mobile heap dividing member 100, in particular in rotation, and the drive device 112 is arranged at the inner end 104 of the mobile heap dividing member 100. The drive device rotates the transport screw in an anti-clockwise direction, seen from the outer end 102 to the inner end 104, for transporting the sugar beets 6 of the crop heap 4 from the outer end 102 towards the inner end 104. Thanks to the arrangement of the driving means 112 of the heap dividing member 100 at the inner end 104, the driving means 112 do not come into contact with the crop heap 4, thus increasing the lifetime of the driving means and limiting the likelihood of damages of the crop 6.

The pick-up apparatus 2 comprises furthermore a loading member 120 adapted for loading the crops into the pick-up opening 42. The loading member 120 is arranged along the first lateral side 36 of the pick-up frame 20. More precisely, the loading member 120 is arranged along an upper side of the first lateral side 36, opposite the pick-up plane PL. The loading member 120 is rotationally driven by a motor 122 (see FIG. 2). The loading member 120 is inclined with respect to the pick-up plane PL and has a front end 124 and a rear end 126. The front end 124 is nearer to the pick-up plane PL than the rear end 126. In other words, the loading member 120 is inclined downwardly to the front.

The front end 124 and the rear end 126 are located at different heights above the pick-up plane PL. The height difference of the front end 124 and the rear end 126 is a loading height LH. The inner end 104 of the dividing member 100 is arranged, in the dividing position, at a height, measured perpendicular with respect to the pick-up plane PL, which is located at least at 50% of the loading height LH and at most at 150% of the loading height. Ideally, the inner end 104 is arranged at a height, measured perpendicular with respect to the pick-up plane PL, which is located within a distance of less than 10% of the loading height from the rear end 126.

The structure of the loading member 120 is similar to the structure of the heap dividing member 100 and will be explained hereafter.

Referring to FIG. 2, the loading member 120 is a loading screw which has an axial loading portion and an axial intake portion. The loading portion and intake portion are axially distinct. The overall axial length of the loading screw is comprised between 500 mm and 2000 mm.

The axial loading portion comprises a loading protrusion 62, in the instant embodiment one single loading protrusion. The loading protrusion 62 is a thread protrusion, the thread having a diameter of between 10 mm and 40 mm, preferably between 15 mm and 25 mm. The lead of the thread protrusion 62 is comprised between 150 mm and 450 mm, and preferably between 200 mm and 240 mm.

Alternatively, the loading protrusion 62 is another protrusion than a helical thread protrusion.

The loading member 120 has an axis Y-Y' which defines an angle γ between 10° and 60°, with respect to the pick-up plane PL.

In one alternative embodiment, the lead of the thread protrusion 62 is comprised between 250 mm and 700 mm, and preferably between 350 mm and 550 mm. In this embodiment, an external diameter of the loading screw is comprised between 300 mm and 700 mm and/or a difference between a core diameter and an external screw diameter between 200 mm and 600 mm.

In this case, the dimensions of the transport screw allow the loading member 120 to convey sugar beets 6 from a lateral position to the first lateral side 36, which is not in the pick-up opening 42, into the pick-up opening 42. This means that it is possible for the loading member 120 to convey sugar beets 6 through a lateral opening defined by a lower side of the core of the transport screw and the upper side of the first lateral side 36.

The pick-up apparatus is used as follows.

The crop heap 4 has a crop heap width HW which is larger than the pick-up width PW. The heap dividing member 100 is brought into contact with the crop heap 4 so that crop 6 arranged outside the projection of the pick-up opening 42 in the pick-up direction PD is transported along the longitudinal axis X-X' of the heap dividing member 100, so that crop 6 tumbles into the projection of the pick-up opening 42 in the pick-up direction PD.

Thanks to the heap divider 10, the pick-up apparatus conveys the crop 6 on the heap 4 so that it falls in front of the pick-up opening 42 on the pick-up area PA without damages and the remainder of the crop heap 4 is not damaged.

The loading screw increases the amount of crops 6 to be loaded without damage.

The specific arrangement of the drives permits dividing the crop heap without damage and in an energy efficient manner.

The individual features of the pick-up apparatus 2 also contribute to an economic manufacturing.

In one embodiment, the adjustable mounting device 106 is mounted on the pick-up frame 20, preferably between the transfer conveyor 34 and the first lateral side 36.

In an alternative embodiment, the loading member 120 is a rotatable member having a transport screw with a thread along the axial loading portion, and a finger-section along the axial intake portion with fingers (not shown) extending perpendicular to the longitudinal axis Y-Y' of the rotatable member. The fingers have substantially a length equal to the thread of the transport screw. The advantage of the fingers is, in the case of a clock-wise rotating transport screw, seen from the front 124 end towards the rear end 126, to throw the conveyed sugar beets into the pick-up section 8.

It is also possible that the thread of the loading screw of the loading member 120, and the thread of the transport screw of the heap dividing member 100 are oriented in an opposite sense than described above, if the drive members rotate the transport screw and the loading screw in a direction which is not opposite to the teaching of the invention.

It is also possible to overcome the drawbacks mentioned at the beginning of the present description and to create a pick-up apparatus that allows picking-up harvested crop arranged in a crop heap having a width larger than the maximum pick-up width, by providing a pick-up apparatus 2 as follows.

Pick-up apparatus 2 for picking up harvested root crop 6, in particular sugar beets, from a root crop heap 4,
the pick-up apparatus 2 comprising:
a pick-up section 8 which
defines a pick-up direction PD a pick-up plane PL and a first lateral outward direction LOD1
comprises a pick-up member 24,
and a pick-up frame 20,
the pick-up frame 20 having a first lateral side 36, a second lateral side 38 and forming a pick-up opening 42,
the pick-up opening 42 and the pick-up direction PD defining a pick-up area PA on the pick-up plane PL,
the pick-up apparatus 2 comprising a heap divider 10 adapted for dividing the root crop heap and comprising a mobile heap dividing member 100, in that
the mobile heap dividing member 100 has an outer end 102, an inner end 104 and a longitudinal axis X-X', in that
the mobile heap dividing member 100 has a heap dividing position, in that
when the mobile heap dividing member 100 is in the heap dividing position, the mobile heap dividing member is adapted to convey root crop 6 which is part of the root crop heap 4 and which is situated outside the pick-up area PA into the pick-up area PA to be picked up by the pick-up member 24, the outer end 102 is located laterally outwards of the first lateral side 36 taken in the first lateral outward direction LOD1,
wherein the rotatable member is a transport screw, in particular having a lead comprised between 250 mm and 700 mm, preferably between 350 mm and 550 mm, and/or an external diameter comprised between 300 mm and 700 mm and/or a difference between a core diameter and an external screw diameter between 200 mm and 600 mm.

This pick-up apparatus can furthermore have the remaining features of the annexed claims or any of the features of the present description.

What is claimed is:

1. A pick-up apparatus for picking up harvested root crop from a root crop heap, the pick-up apparatus comprising:
a pick-up section which defines a pick-up direction, a pick-up plane, and a first lateral outward direction;
a pick-up member of the pick-up section;
a pick-up frame of the pick-up section, the pick-up frame having a first lateral side, a second lateral side and forming a pick-up opening, the pick-up opening and the pick-up direction defining a pick-up area on the pick-up plane;
a heap divider adapted for dividing the root crop heap; and
a mobile heap dividing member, characterized in that the mobile heap dividing member has an outer end, an inner end and a longitudinal axis, characterized in that the mobile heap dividing member has a heap dividing position, characterized in that when the mobile heap dividing member is in the heap dividing position, the mobile heap dividing member is adapted to convey root crop which is part of the root crop heap and which is situated outside the pick-up area into the pick-up area to be picked up by the pick-up member, the outer end located laterally outwards of the first lateral side taken in the first lateral outward direction, and the longitudinal axis inclined about an elevation angle α between α=0° and 20°, with respect to the pick-up plane, the mobile heap dividing member, by the elevation angle α, in the heap diving position is adapted to form a platform on the divided root crop heap to receive harvested root crop rolling off the top of the root crop heap downward to the pick-up plane.

2. The pick-up apparatus according to claim 1, wherein, in the heap dividing position, the longitudinal axis is inclined between β=0° and 20° with respect to the first lateral outward direction.

3. The pick-up apparatus according to claim 1, wherein, in the heap dividing position, the outer end is located with respect to the inner end forward taken in the pick-up direction, and/or wherein, in the heap dividing position, the outer end is located upward of the inner end with respect to the pick-up plane.

4. The pick-up apparatus according to claim 1, wherein the mobile heap dividing member is a rotatable member, the longitudinal axis being an axis of rotation of the rotatable member.

5. The pick-up apparatus according to claim 4, wherein the rotatable member is a transport screw.

6. The pick-up apparatus according to claim 1, wherein the mobile heap dividing member has a transport position in which the outer end and the inner end are located between the first and second lateral sides.

7. The pick-up apparatus according to claim 1, wherein the pick-up apparatus comprises a drive device, adapted to drive the mobile heap dividing member, and in that the drive device is arranged at the inner end of the mobile heap dividing member.

8. The pick-up apparatus according to claim 1, wherein the pick-up section has a loading member located along the first lateral side.

9. The pick-up apparatus according to claim 8, wherein the loading member is a loading screw.

10. The pick-up apparatus according to claim 8, wherein an axis of the loading member defines an angle γ between 10° and 60° with respect to the pick-up plane.

11. The pick-up apparatus according to claim 8, wherein the loading member has a front end and a rear end defining a loading height, and wherein the inner end of the mobile heap dividing member is arranged, in the heap dividing position, at a height, measured perpendicular with respect to the pick-up plane, which is located at least at 50% of the loading height.

12. The pick-up apparatus according to claim 1, wherein the inner end of the mobile heap dividing member is arranged, in the heap dividing position, at a height, measured perpendicular with respect to the pick-up plane, which is located at least at 100 mm from the pick-up plane.

13. The pick-up apparatus according to claim 1, wherein the mobile heap dividing member, in the heap dividing position, is adapted to form a platform on the root crop heap, the platform being adapted to receive harvested root crop rolling off the top of the root crop heap downward towards the pick-up plane.

14. The pick-up apparatus according to claim 1, wherein the longitudinal axis is inclined about an elevation angle α between α=0° and 10°, with respect to the pick-up plane.

15. The pick-up apparatus according to claim 5, wherein the transport screw has a lead comprised between 250 mm and 700 mm and/or and external diameter comprised between 300 mm and 700 mm and/or a difference between a core diameter and an external screw diameter between 200 mm and 600 mm.

16. The pick-up apparatus according to claim 5, wherein the transport screw has a lead comprised between 350 mm and 550 mm and/or and external diameter comprised between 300 mm and 700 mm and/or a difference between a core diameter and an external screw diameter between 200 mm and 600 mm.

17. The pick-up apparatus according to claim 6, wherein the mobile heap dividing member is held by an adjustable mounting device mounted on the pick-up frame and the mobile heap dividing member is displaceable between the transport position and the heap dividing position by means of the adjustable mounting device.

18. The pick-up apparatus according to claim 7, wherein the drive device is a motor adapted to drive the mobile heap dividing member in rotation.

19. The pick-up apparatus according to claim 9, wherein the loading screw has a lead comprised between 250 mm and 700 mm and/or an external diameter comprised between 300 and 700 mm and/or a difference between a core diameter and an external screw diameter between 200 mm and 600 mm.

20. The pick-up apparatus according to claim 9, wherein the loading screw has a lead comprised between 350 mm and 550 mm and/or an external diameter comprised between 300 and 700 mm and/or a difference between a core diameter and an external screw diameter between 200 mm and 600 mm.

* * * * *

UNITED STATES PATENT AND TRADEMARK OFFICE
CERTIFICATE OF CORRECTION

PATENT NO. : 9,681,606 B2  
APPLICATION NO. : 15/049993  
DATED : June 20, 2017  
INVENTOR(S) : Leo Mastalir and Michael Gallmeier Page 1 of 1

It is certified that error appears in the above-identified patent and that said Letters Patent is hereby corrected as shown below:

On the Title Page

(72) Inventors should read: Leo Mastalir, Hagendorf (AT), Michael Gallmeier, Ergoldsbach (AT)

Signed and Sealed this
Twenty-first Day of November, 2017

Joseph Matal
*Performing the Functions and Duties of the
Under Secretary of Commerce for Intellectual Property and
Director of the United States Patent and Trademark Office*